United States Patent [19]
Gore

[11] Patent Number: 6,024,786
[45] Date of Patent: Feb. 15, 2000

[54] STABLE COMPOSITIONS OF NANO-PARTICULATE UNMODIFIED PIGMENTS AND INSOLUBLE COLORANTS IN AQUEOUS MICROEMULSIONS, AND PRINCIPLE OF STABILITY AND METHODS OF FORMATION THEREOF

[75] Inventor: Makarand P. Gore, Corvallis, Oreg.

[73] Assignee: Hewlett-Packard Company, Palo Alto, Calif.

[21] Appl. No.: 08/960,858

[22] Filed: Oct. 30, 1997

[51] Int. Cl.7 ...................................................... C09D 11/00
[52] U.S. Cl. ...................................... 106/31.65; 106/31.86
[58] Field of Search ............................... 106/31.86, 31.65

[56] References Cited

U.S. PATENT DOCUMENTS

| | | | |
|---|---|---|---|
| 5,283,056 | 2/1994 | Chung et al. .............................. | 424/49 |
| 5,374,614 | 12/1994 | Behan et al. ................................ | 512/3 |
| 5,389,297 | 2/1995 | Narayanan ............................... | 252/312 |
| 5,401,325 | 3/1995 | Mihelic et al. ........................... | 134/39 |
| 5,443,628 | 8/1995 | Loria et al. ............................ | 106/20 C |
| 5,444,041 | 8/1995 | Owen et al. ................................ | 514/2 |
| 5,444,078 | 8/1995 | Yu et al. .................................. | 514/372 |
| 5,531,816 | 7/1996 | Wickramanayake .................. | 106/20 R |
| 5,531,818 | 7/1996 | Lin et al. ............................... | 106/23 C |
| 5,713,989 | 2/1998 | Wickramanayake et al. .......... | 106/31.6 |

FOREIGN PATENT DOCUMENTS

| | | | |
|---|---|---|---|
| 0718383A1 | 6/1996 | European Pat. Off. | ........ C09D 11/00 |
| 0853106A2 | 7/1998 | European Pat. Off. | ........ C09D 11/00 |
| 63-159484 | 12/1986 | Japan | ............................. C09D 11/00 |
| 3-234772 | 2/1990 | Japan | ............................. C09D 11/00 |
| 8-333531 | 6/1996 | Japan | ............................. C09D 11/00 |
| WO9747699 | 12/1997 | WIPO | ............................. C09D 11/00 |

OTHER PUBLICATIONS

Neelima J. Kale et al, "Studies on microemulsions using Brij 96 as surfactant and glycerin, ethylene glycol and propylene glycol as cosurfactants" International Journal of Pharmaceutics, vol. 57, pp. 87, 89, 93 (1989) No Month.

Application Bulletin and Product Information (3), "Invert Solvents" no date available.

*Primary Examiner*—Mark L. Bell
*Assistant Examiner*—Veronica F. Faison

[57] ABSTRACT

If the particle size of pigments in ink-jet inks is reduced below 500 nm, then the ink compositions achieved extraordinary stability; that is, there is no visible sediment formed after three weeks at ambient temperature and there is no sediment formed after heating to 70° C. for 10 min followed by cooling to 0° C. for 10 min. No dispersant is necessary, and the pigment particles having such a defined size may be incorporated into microemulsions, using a suitable oil (water-immiscible organic compound), at least one amphiphile, and water.

22 Claims, No Drawings

6,024,786

STABLE COMPOSITIONS OF NANO-PARTICULATE UNMODIFIED PIGMENTS AND INSOLUBLE COLORANTS IN AQUEOUS MICROEMULSIONS, AND PRINCIPLE OF STABILITY AND METHODS OF FORMATION THEREOF

TECHNICAL FIELD

The present invention relates ink-jet inks for thermal ink-jet printing, and, more particularly, to pigment-based ink-jet inks.

BACKGROUND ART

Pigment-based inks potentially offer a variety of desirable properties, viz., waterfastness, lightfastness, etc. However, preparation of pigment-based inkjet inks has not been a widely successful approach due to tendency of pigments to agglomerate, which results in "precipitation" or "settling" of the colorants and a very short dispersion life. A variety of laborious and/or expensive approaches such as surface modifications of specific colorants, use of dispersants, and encapsulation of colorants in polymer coats, have been at the cutting edge of methods to alleviate these problems. These may result in loss of attributes such as waterfastness, increased cost and chemical complexity of the system, decreased material compatibility and limited choice of colorants. These methods do not share a common basis of stability. Therefore, inks based on these have to be individually developed for each colorant and dispersants and/or additives, each of which add new problems to the complexity of the ink. This results in enormous effort on ink-jet ink manufacturers to develop an ink system.

U.S. Pat. No. 5,169,438, issued on Dec. 8, 1992, to H. Matrick, discloses the preparation and use of water-insoluble colorants comprising pigments in ink-jet inks. The pigments are rendered soluble in the ink-jet ink vehicle by use of a dispersant, which keeps the pigment in suspension prior to printing on a print medium. The patentee discloses that the particle size of the pigment must be in the range of 0.005 to 15 $\mu$m (5 to 15,000 nm).

No disclosure is given in this reference as to how to provide the necessary particle size of the pigment. However, it is common knowledge that such small particle sizes are achieved by ball milling or microfluidization. Ball milling involves milling the pigment particles in a ball mill with, typically, metal or ceramic balls, followed by size filtration, using a centrifuge or appropriate screening. However, a disadvantage with this process is that it introduces impurities from the balls during milling, which adversely affect the properties of the ink. Analogous grinding processes also suffer from the same defect.

What is needed is a pigment-based colorant that is stable in solution and is free of impurities, while employing a relatively facile process to prepare.

DISCLOSURE OF INVENTION

In accordance with the present invention, the inventor has discovered that if the particle size of the pigment is reduced below 500 nm, then the ink-jet ink compositions achieved extraordinary stability. By "extraordinary stability" is meant that no sediments are formed after a period of three weeks and that no sediments are formed after warming the ink compositions to 70° C. for 10 min, followed by cooling to 0° C. for ten min. No dispersant is necessary, and the pigment particles having such a defined size may be incorporated into microemulsions, using a suitable oil and an amphiphile.

The pigment-based ink composition of the present invention comprises:

(a) at least one pigment, which has an average particle size of less than 500 nm;

(b) at least one water-insoluble compound;

(c) at least one amphiphile; and (d) water.

The pigment is stabilized by the following process:

(a) providing particles of at least one pigment; and (b) in either order, (i) forming a microemulsion of at least one pigment in a vehicle comprising at least one water-immiscible organic compound, at least one amphiphile, and water; and (ii) reducing the size of the particles to an average particle size below about 500 nm.

BEST MODES FOR CARRYING OUT THE INVENTION

The present invention is based on a breakthrough observation that during the dispersion of carbon black in microemulsions, the compositions achieved extraordinary stability when particle size dropped below 500 nm. The system consists of an aqueous microemulsion of an oil and the fine pigment particles having an average size of less than 500 nm ±50 nm, and preferably about 300 nm or less, and most preferably less than 100 nm ±20 nm.

Fifteen compositions have been prepared using permutations of three different vehicles and five pigments. The vehicles were based on (a) ethylene glycol phenyl ether (EPH), (b) various INVERT compositions, and (c) a mixture of xylenes. The EPH microemulsions are exemplified by the formulation 10 wt % EPH;

9 wt % sodium xylene sulfonate (SXS); and 81 wt % water.

The INVERT-based formulations are commercially-available microemulsion compositions, available from Dow Chemical Company. The xylene-based microemulsions are exemplified by the formulation 6.3 wt % Triton X100 (a surfactant);

4.2 wt % sulfated castor oil;

3.65 wt % xylene;

4.0 wt % pigment; and 8.0 wt % 2-amino-2-ethyl-1,3-propane diol (AEPD).

The pigments were unmodified carbon black, Hostafine black TS, Hostafine black T, Hostafine Magenta, and Imperon Brilliant Pink. The unmodified carbon black was Carbon Black FW18, available from Degussa (Akron, Ohio). The Hostafine pigments are made by HOECHST and are available from Clariant (Coventry, R.I.). The Imperon pigment is available from Dystar (Charlotte, N.C.).

Thirteen of the microemulsions are spontaneously formed, providing a success rate of about 86%, in random attempts to make microemulsions from fine particles. Without subscribing to any particular theory, it is believed that the system achieves its stability due to unique size compatibility and adhesion related "soaking" or submerging of the pigment particles inside the oil phase of the "oil droplet" in the microemulsion.

This is a versatile, broadly enabling, self-sufficient, cost-effective, and yet a relatively simple means for dispersing "off the shelf" pigments and colorants without any special treatments, modifications, or use of special dispersants.

There are several environmentally benign, non-toxic, non-corrosive microemulsion systems available (e.g., those normally used for drug formulations in pharmaceutical industry) for extension to the ink technology. These may allow resolution of material compatibility problems.

The microemulsions are formed by mixing a water-immiscible organic solvent, water, and the pigment particles. The pigment particles may be either reduced in size in the microemulsion or prior to mixing with the solvent to form the microemulsion. Preferably, the solvents and amphiphile (preferably, hydrotrope) are mixed first, followed by the addition of water. The particle sizing is typically done after the mixture has been prepared. The Imperon and Hostafine pigments are sold as concentrates. Ball milling to reduce particle size may be done with zirconia beads, available from Aldrich Chemical Company (Milwaukee, Wis.), for 24 hours. Alternatively, a microfluidizer, available from Microfluidics Corporation (Newton, Mass.) may be used. The particles are then filtered through a 5 $\mu$m filter, which has been found to result in average particle sizes of less than 500 nm.

The concentration of the pigment is generally in the range from about 0.1 to 15 wt % of the ink composition. Preferably, the pigment represents about 0.1 to 8 wt % of the ink composition.

Examples of water-immiscible organic compounds that may be suitably employed in the practice of the invention include, but are not limited to, water-insoluble mono- or polyglycol ethers; water-insoluble mono- or polyglycol phenyl ethers; water-in-soluble N-substituted 2-pyrrolidones; mono- or polyglycol esters; and water-insoluble hydrocarbons. In general, any water-insoluble organic compound, or combination thereof, may be employed in the practice of the invention so long as it is capable of stably containing the selected pigments in the microemulsion and so long as it may be solubilized by an amphiphile. Specific examples of water-immiscible organic compounds that are preferably employed in the practice of the invention include, but are not limited to: (1) ethylene, propylene, polyethylene, and polypropylene glycol phenyl ethers; and (2) ethylene, propylene, polyethylene, and polypropylene glycol esters such as acrylates. Additionally, specific examples of preferably-employed hydrocarbons include toluene, xylenes, naphthalene, and phenanthrene. Ethylene glycol phenyl ether and propylene glycol phenyl ether are most preferably employed in the practice of the invention. The water-immisible organic component may range in concentration from about 1 to 70 wt % of the ink-jet ink composition.

The amphiphile employed in the practice of the invention may be any amphiphile that yields a microemulsion with the water-insoluble organic compound and water. Suitable amphiphiles solubilize the water-insoluble organic compound in water by breaking the compound into very small droplets and maintaining these droplets in a microemulsion. For example, amine oxides, such as N,N-dimethyl-N-dodecyl amine oxide (NDAO), may be suitably employed in the practice of the invention. Other examples of amine oxides suitably employed as amphiphiles include, but are not limited to, N,N-dimethyl-N-tetradecyl amine oxide (NTAO); N,N-dimethyl-N-hexadecyl amine oxide (NHAO); N,N-dimethyl-N-octadecyl amine oxide (NOAO); and N,N-dimethyl-N-(Z-9-octa-decenyl)-N-amine oxide (OOAO). Further examples of amphiphiles include alkyl sulfonates and alkyl benzene sulfonates.

The proper amount of amphiphile in the ink-jet ink composition is that amount that solubilizes the water-insoluble organic compound. It is noted that a mixture of amphiphiles may be employed in the practice of the invention. The determination of a given amphiphile and its concentration is considered not to constitute undue experimentation in view of the teachings of this invention.

Preferably, a class of amphiphiles termed "hydrotropic amphiphiles" is employed in the practice of the invention. Hydrotropic amphiphiles, like other surfactants in general, serve to solubilize the insoluble organic component in the ink composition. However, hydrotropic amphiphiles do not result in the precipitous drop in surface tension associated with the use of other surfactants, such that the reduction in surface tension for inks employing hydrotropic amphiphiles in the practice of the invention is curbed in comparison. In contrast, the steep drop in surface tension caused by the incorporation of other surfactants into ink-jet inks is known to cause puddles on the nozzle plates of the printhead, thereby negatively affecting drop ejection characteristics. Moreover, these other surfactants increase the penetration rate of the ink into the paper to such a degree that edge acuity may be affected. Thus, hydrotropic amphiphiles serve to solubilize the water-insoluble organic compound without the attendant degree of puddling on the nozzle plate or the loss of edge acuity that generally plague inks containing other surfactants. However, in situations where edge acuity is not critical, such as textile printing, surfactants other than hydrotropic amphiphiles may be used. Hydrotropic amphiphiles are preferred where edge acuity is critical, such as printing on paper.

The hydrotropic amphiphile may be anionic, cationic, or non-ionic in nature. Examples of anionic hydrotropic amphiphiles suitably employed in the practice of the invention include, but are not limited to, sodium benzoate, sodium salicylate, sodium benzene sulfonate, sodium benzene disulfonate, sodium toluene sulfonate, sodium xylene sulfonate, sodium cumene sulfonate, sodium cymene sulfonate, and sodium cinnamate. Examples of cationic hydrotropic amphiphiles suitably employed in the practice of the invention include, but are not limited to, para amino benzoic acid hydrochloride, procaine hydrochloride, and caffeine. Examples of non-ionic hydrotropic amphiphiles suitably employed in the practice of the invention include, but are not limited to, resorcinol and pyrogallol.

Optionally, a co-surfactant may be added to the present ink-jet ink compositions. Examples of suitably-employed co-surfactants include, but are not limited to, lactams such as 2-pyrrolidone; glycol esters such as propylene glycol laurate; mono- and di-glycol ethers, including ethylene glycol monobutyl ether, diethylene glycol ethers, diethylene glycol mono ethyl, butyl, hexyl ethers, propylene glycol ether, dipropylene glycol ether, and triethylene glycol ether; mid-chain alcohols such as butyl alcohol, pentyl alcohol, and monologous alcohols; and acetylenic polyethylene oxides. Preferably, if a co-surfactant is employed, the co-surfactant comprises a mid-chain alcohol, having from 3 to 8 carbon atoms, such as iso-propanol and pentanol. The co-surfactant may represent up to 10 wt % of the ink composition, either serving as a separate component or as a partial replacement for the amphiphile.

Consistent with the requirements for this invention, various types of additives may be employed in the ink to optimize the properties of the ink composition for specific applications. For example, as is well known to those skilled in the art, one or more biocides, fungicides, and/or slimicides (microbial agents) may be used in the ink composition as is commonly practiced in the art. Examples of suitably employed microbial agents include, but are not limited to, NUOSEPT (Nudex, Inc.), UCARCIDE (Union Carbide), VANCIDE (RT Vanderbilt Co.), and PROXEL (ICI America). Additionally, sequestering agents such as EDTA may be included to eliminate deleterious effects of heavy metal impurities, and buffer solutions may be used to control the pH of the ink. Other known additives such as viscosity modifiers and other acrylic or non-acrylic polymers may be added to improve various properties of the ink compositions as desired.

The amount of amphiphile appropriately employed in a particular pigment-based ink composition may be determined in one of two ways, namely by an abbreviated method or a more systematic method. In the abbreviated method, one must first combine the organic compound(s) and the water in a ratio that reflects the desired final composition of the ink. The resulting two-phase liquid is thereafter titrated with the selected amphiphile(s) until a clear solution is obtained, representing the solubilization of the organic compound such that a single-phase solution is achieved. About 1% excess amphiphile may optionally be added to ensure a stable solution. Thus, the appropriate relational concentrations of the organic compound(s), water, and amphiphile(s) are determined through the above-described titration process.

A more systematic method involves the construction of a phase diagram, as discussed in U.S. Pat. No. 5,531,816, which is assigned to the same assignee as the present invention.

EXAMPLES

Example 1

A xylene vehicle was prepared by combining 63 g Triton X-100 (a surfactant), 42 g sulfated caster oil, and 36.5 g xylene, providing a total of 141.5 g, which was then diluted to 1,000 g with water.

A microliquid capsulate suspension was prepared by combining 4.40 g carbon black and 100 g xylene vehicle. The combination was transferred to a ceramic container charged with 100 g of zirconia bead media and the container was rolled until the composition could be filtered through a 5 $\mu$m filter (usually for 24 hr). Alternatively, fluidization using a microfluidizer for 1 hr at 15,000 psi operating pressure accomplishes the same result. This indicates that the average particle size of less than 500 nm has been reached. AEPD (2-amino-2-ethyl-1,3-propanediol) was added to optimize the performance of the inks. The inks were filtered through 5 $\mu$m and filled in pens for use in a DeskJet® 600 printer. Good (acceptable) printing was produced.

The nylon filters used in these experiments (available from Micron Separations, Inc. (Westborough, Mass.)) have a very tight particle tolerance, and more than a few ppm of larger particles completely block the filters. It has been observed by the inventor that the average particle size on mixtures that can be filtered through 5 $\mu$m filters after grinding is less than 500 mn, typically, about 300 nm.

It was found that as the particle size dropped, the emulsions of pigment suspended in microemulsions became stable. Specifically, the compositions that could not be filtered through such filters developed visible sediment over the test time of three weeks, while the compositions that could be filtered did not form such sediment.

Example 2

The microliquid capsulated solid particles in microemulsions seemed to have special stability associated with them based on size compatibility based on 10% EPH/9% SXS/ H$_2$O microemulsion (EPH is ethylene glycol phenyl ether; SXS is sodium xylene sulfonate).

A xylene vehicle was prepared by combining 63.0 g Triton X-100, 42.0 g sulfated caster oil, and 38.5 g xylene. The combination was then diluted to 1,000 g with water.

In one trial, carbon black (3 g) was then combined with 97 g of the xylene vehicle and ground in a ball mill (100 g zirconia balls) at 200 rpm for 24 hrs. As in Example 1, a microfluidizer may be used to the same effect.

In another trial, 6 g carbon black (deGussa) was combined with 57 g xylene vehicle and ground in a ball mill (60 g zirconia balls) at 5,000 rpm for 1 hr.

The resulting mixture was then filtered through a 5 $\mu$m filter, employing the nylon filters discussed in Example 1. The ink appeared to be homogeneous. The mixture was then heated to 70° C. and cooled in ice. No change was observed, and no sediment formed. It was concluded that there exists a certain particle size and microemulsion relation whereby particles of a certain size are coated by the oil phase and are thus "stabilized". As in Example 1, inks having unfiltered pigments, and hence average particle sizes greater than 500 nm, evidenced visible sediment formation in this test, as well as after three weeks at ambient temperature.

Examples 3–14

The following twelve inks were prepared, employing three vehicles (INVERT 1000, xylene, and a solution of 9% EPH and 9% SXS in water, and four pigments, two black (Hostafine Black T and Hostafine Black TS) and two magenta (Hostafine Rubin F6B and Imperon Brilliant Pink K). The Table below relates the combinations to the specific examples.

|  | Invert 1000 | Xylene | 9% EPH, 9% SXS |
|---|---|---|---|
| Black T | Example 3 | Example 4 | Example 5 |
| Black TS | Example 6 | Example 7 | Example 8 |
| Rubin F6B | Example 9 | Example 10 | Example 11 |
| Brilliant Pink K | Example 12 | Example 13 | Example 14 |

8 g of the pigment was mixed with sufficient vehicle to form 100 g mixture. The inks were put on rollers and ball milled with zirconia bead media for 24 hrs, followed by filtration through the 5 $\mu$m filter discussed in Examples 1 and 2.

The inks were examined visually by looking through films of ink formed on caps and walls of a container after a brief shaking with the following results:

| EXAMPLE | OBSERVATION |
|---|---|
| 3 | homogeneous |
| 4 | particulate, but appeared nearly homogeneous |
| 5 | particulate - needs wetting agent |
| 6 | homogeneous |
| 7 | homogeneous |
| 8 | particulate - needs wetting agent |
| 9 | homogeneous |
| 10 | homogeneous |
| 11 | homogeneous |
| 12 | homogeneous |
| 13 | homogeneous |
| 14 | homogeneous |

Notes -
1. Unstable compositions (Examples 4 and 8) showed particulates with the naked eye under room (laboratory) lighting; no magnification was needed.
2. Only two of the twelve inks needed a wetting agent, and both of these were EPH-based.

It was concluded that pigments less than 500 nm in microemulsion generally form an exceptionally stable system, with regard to lack of sediment formation either when measured either at ambient temperature for three weeks or when subjected to 70° C. for 10 min followed by exposure to 0° for 10 min. Such lack of sediment formation is not observed for pigments having an average particle size greater than 500 nm. The pigments employed in the practice of the present invention are not chemically modified, and require no dispersants.

INDUSTRIAL APPLICABILITY

The stable compositions of nano-particulate unmodified pigments in aqueous microemulsions are expected to find use in ink-jet ink printing.

Thus, there has been disclosed stable compositions of nano-particulate unmodified pigments in aqueous microemulsions and a method for making the same. It will be readily apparent to those skilled in this art that various changes and modifications of an obvious nature may be made, and all such changes and modifications are intended to fall within the scope of the appended claims.

What is claimed is:

1. A stable pigment-based ink-jet ink composition for ink-jet printing comprising:
   (a) at least one non-deagglomerated pigment having an average particle size less than 500 nm;
   (b) at least one water-insoluble organic compound;
   (c) at least one amphiphile; and
   (c) water.

2. The stable pigment-based ink-jet ink composition of claim 1 wherein said at least one non-deagglomerated pigment has a particle size of about 300 nm or less.

3. The stable pigment-based ink-jet ink composition of claim 1 wherein said at least one non-deagglomerated pigment has a concentration ranging from about 0.1 to 15 wt %.

4. The stable pigment-based ink-jet ink composition of claim 3 wherein said at least one non-deagglomerated pigment has a concentration ranging from about 0.1 to 8 wt %.

5. The stable pigment-based ink-jet ink composition of claim 1 wherein said water-insoluble organic compound is selected from the group consisting of water-insoluble monoglycol ethers; water-insoluble polyglycol ethers; water-insoluble monoglycol phenyl ethers; water-insoluble polyglycol phenyl ethers; water-insoluble N-substituted 2-pyrrolidones; monoglycol esters; polyglycol esters; and water-insoluble hydrocarbons.

6. The stable pigment-based ink-jet ink composition of claim 5 wherein said water-insoluble organic compound is selected from the group consisting of ethylene glycol phenyl ethers, propylene glycol phenyl ethers, polyethylene glycol phenyl ethers, polypropylene glycol phenyl ethers, ethylene glycol esters, propylene glycol esters, polyethylene glycol esters, polypropylene glycol esters, toluene, xylenes, naphthalene, and phenanthrene.

7. The stable pigment-based ink-jet ink composition of claim 6 wherein said water-insoluble organic compound is selected from the group consisting of ethylene glycol phenyl ether and propylene glycol phenyl ether.

8. The stable pigment-based ink-jet ink composition of claim 1 wherein said amphiphile is selected from the group consisting of amine oxides, alkyl sulfonates, and alkyl benzene sulfonates.

9. The stable pigment-based ink-jet ink composition of claim 8 wherein said amphiphile is selected from the group consisting of N,N-dimethyl-N-dodecyl amine oxide, N,N-dimethyl-N-tetradecyl amine oxide, N,N-dimethyl-N-hexadecyl amine oxide, N,N-dimethyl-N-octadecyl amine oxide, and N,N-dimethyl-N-(Z-9-octa-decenyl)-N-amine oxide.

10. The stable pigment-based ink-jet ink composition of claim 1 wherein said amphiphile is a hydrotropic amphiphile selected from the group consisting of sodium benzoate, sodium salicylate, sodium benzene sulfonate, sodium benzene disulfonate, sodium toluene sulfonate, sodium xylene sulfonate, sodium cumene sulfonate, sodium cumene sulfonate, sodium cinnamate, para amino benzoic acid hydrochloride, procaine hydrochloride, caffeine, resorcinol and pyrogallol.

11. A process for stabilizing at least one pigment in an ink-jet ink composition comprising:
   (a) providing particles of at least one non-deagglomerated pigment; and
   (b) in either order,
      (i) forming a microemulsion of said at least one non-deagglomerated pigment in a vehicle comprising at least one water-immiscible organic compound, at least one amphiphile, and water; and
      (ii) reducing the size of said particles to an average particle size below about 500 nm.

12. The process of claim 11 wherein said at least one non-deagglomerated pigment is reduced to an average particle size of 300 nm or less.

13. The process of claim 11 wherein said at least one pigment has a concentration ranging from about 0.1 to 15 wt %.

14. The process of claim 13 wherein said at least one non-deagglomerated pigment has a concentration ranging from about 0.1 to 8 wt %.

15. The process of claim 11 wherein said water-insoluble organic compound is selected from the group consisting of water-insoluble monoglycol ethers; water-insoluble polyglycol ethers; water-insoluble monoglycol phenyl ethers; water-insoluble polyglycol phenyl ethers; water-insoluble N-substituted 2-pyrrolidones; monoglycol esters; polyglycol esters; and water-insoluble hydrocarbons.

16. The process of claim 15 wherein said water-insoluble organic compound is selected from the group consisting of ethylene glycol phenyl ethers, propylene glycol phenyl ethers, polyethylene glycol phenyl ethers, polypropylene glycol phenyl ethers, ethylene glycol esters, propylene glycol esters, polyethylene glycol esters, polypropylene glycol esters, toluene, xylenes, naphthalene, and phenanthrene.

17. The process of claim 16 wherein said water-insoluble organic compound is selected from the group consisting of ethylene glycol phenyl ether and propylene glycol phenyl ether.

18. The process of claim 11 wherein said amphiphile is selected from the group consisting of amine oxides, alkyl sulfonates, and alkyl benzene sulfonates.

19. The process of claim 18 wherein said amphiphile is selected from the group consisting of N,N-dimethyl-N-dodecyl amine oxide, N,N-dimethyl-N-tetradecyl amine oxide, N,N-dimethyl-N-hexadecyl amine oxide, N,N-dimethyl-N-octadecyl amine oxide, and N,N-dimethyl-N-(Z-9-octa-decenyl)-N-amine oxide.

20. The process of claim 11 wherein said amphiphile is a hydrotropic amphiphile selected from the group consisting of sodium benzoate, sodium salicylate, sodium benzene sulfonate, sodium benzene disulfonate, sodium toluene sulfonate, sodium xylene sulfonate, sodium cumene sulfonate, sodium cumene sulfonate, sodium cinnamate, para amino benzoic acid hydrochloride, procaine hydrochloride, caffeine, resorcinol and pyrogallol.

21. The process of claim 11 wherein said particles of said non-deagglomerated pigment are reduced in size by either ball milling or microfluidization.

22. The process of claim 21 wherein said particles of said non-deagglomerated pigment are further filtered through a filter having 5 μm pores after being reduced in size.

* * * * *

UNITED STATES PATENT AND TRADEMARK OFFICE
CERTIFICATE OF CORRECTION

| | |
|---|---|
| PATENT NO. | : 6,024,786 |
| APPLICATION NO. | : 08/960858 |
| DATED | : February 15, 2000 |
| INVENTOR(S) | : Makarand P. Gore |

It is certified that error appears in the above-identified patent and that said Letters Patent is hereby corrected as shown below:

Column 8, Claim 13, line 23, before "pigment" insert -- non-deagglomerated --.

Signed and Sealed this

Seventeenth Day of July, 2007

JON W. DUDAS
*Director of the United States Patent and Trademark Office*